(12) United States Patent
Foster

(10) Patent No.: US 6,530,261 B1
(45) Date of Patent: Mar. 11, 2003

(54) SEMI-TRUCK TRAILER BRAKE TEST DEVICE, SYSTEM AND METHOD

(76) Inventor: James F. Foster, 480 15th St., Red Wing, MN (US) 55066

( * ) Notice: Subject to any disclaimer, the term of this patent is extended or adjusted under 35 U.S.C. 154(b) by 0 days.

(21) Appl. No.: 09/759,139

(22) Filed: Jan. 16, 2001

(51) Int. Cl.[7] .............................. G01L 5/28; G01L 1/02; G01M 03/02; G01M 03/26
(52) U.S. Cl. ................................ 73/39; 73/40; 73/129
(58) Field of Search ............................ 73/39, 40, 121, 73/129, 49.7

(56) References Cited

U.S. PATENT DOCUMENTS

| | | | | |
|---|---|---|---|---|
| 2,510,538 A | * | 6/1950 | Andrews ........................ | 73/39 |
| 2,674,121 A | * | 4/1954 | Gorman ......................... | 73/39 |
| 3,103,808 A | * | 9/1963 | Eichelberger .................. | 73/39 |
| 3,584,500 A | * | 6/1971 | Diehl ............................. | 73/39 |
| 4,847,770 A | * | 7/1989 | Kane et al. ............ | 364/426.05 |
| 5,357,800 A | * | 10/1994 | Reuter et al. ................. | 73/121 |
| 5,406,837 A | * | 4/1995 | Britt ............................. | 73/121 |
| 5,488,859 A | | 2/1996 | Britt ............................. | 73/121 |
| 5,668,314 A | | 9/1997 | Jones ........................... | 73/129 |
| 5,681,992 A | * | 10/1997 | Klein et al. ................... | 73/121 |
| 5,705,737 A | * | 1/1998 | Liao ............................. | 73/49.7 |
| 5,747,685 A | * | 5/1998 | Skantar ........................ | 73/121 |
| 5,898,102 A | * | 4/1999 | Skantar ........................ | 73/39 |
| 6,272,904 B1 | * | 8/2001 | Neely, Jr. et al. ............. | 73/49.7 |

* cited by examiner

Primary Examiner—Hezron Williams
Assistant Examiner—David J. Wiggins
(74) Attorney, Agent, or Firm—Joan I. Norek; The Law Office of Joan I. Norek

(57) ABSTRACT

A relatively simple and inexpensive apparatus for testing at least the air brakes of trailers includes a portable air-brake governing or actuation system and a hand-held control pendent, operating off an independent compressed air supply. Without the coupling of, and connections with, a tractor, the air brakes of a trailer can be applied and released, and held in a charged mode for a period of time during which any loss of air pressure can be monitored. Using the apparatus a single person can conduct the entire air brake test process, including applying and releasing the brakes while simultaneously visually and manually inspecting the brakes.

22 Claims, 3 Drawing Sheets

STEP (a)
CONNECT A TEST DEVICE BETWEEN AN AIR LINE OF A TRAILER AND A SOURCE OF COMPRESSED AIR, THE TEST DEVICE HAS A CONTROL HUB AND A CONTROL PENDENT, AND THE CONTROL PENDENT HAS CONTROLS AND A PRESSURE GAUGE.

STEP (b)
CHARGE THE AIR LINE OF THE TRAILER WITH COMPRESSED AIR FROM THE SOURCE OF COMPRESSED AIR THROUGH THE TEST DEVICE BY THE OPERATION OF THE CONTROLS OF THE CONTROL PENDENT.

STEP (c)
HOLD THE CHARGE IN THE AIR LINE OF THE TRAILER BY THE OPERATION OF THE CONTROLS OF THE CONTROL PENDENT WHILE DETERMINING AIR LEAKAGE FROM THE AIR LINE.

STEP (d)
EXHAUST THE CHARGE IN THE AIR LINE OF THE TRAILER THROUGH THE TEST DEVICE BY THE OPERATION OF THE CONTROLS OF THE CONTROL PENDENT.

Fig. 6

SEMI-TRUCK TRAILER BRAKE TEST DEVICE, SYSTEM AND METHOD

BACKGROUND OF THE INVENTION

Frequent periodic testing of the air brake systems of semi-truck trailers (tractor-trailers) is required under federal regulations, and is important to vehicle safety. These tests are conducted by employees of the trucking industry on a regular basis.

The testing of an air brake system of a tractor-trailer conventionally is conducted after the tractor has been coupled to the trailer, with the air lines between the tractor and trailer connected. This coupled/connected condition is necessary because it is the tractor, not the trailer, which is equipped to generate and control compressed air. With the air lines from the tractor to the trailer connected, trailer air system is charged through the tractor air system via its brake valve equipment, and the brakes are applied and released sequentially via the tractor brake pedal.

The conventional test method is not only handicapped by the requirement of providing a coupled trailer, but also by the need to employ two people, namely one operating the trailer systems from the cab of a tractor (for instance, depressing and releasing the brake pedal) and one positioned to observe trailer brake operation. The trailer brake operation must be eyed from a position closely proximate to, or beneath, the trailer because the brakes are located about the trailer axles. Such observation is not possible from inside the cab of a coupled tractor. And the operation of a tractor's brake pedal is generally not possible from any position except inside the tractor cab.

Similar circumscriptions attend the testing of a trailer's electrical light system. A trailer typically has tail lights, brake lights, turn signals, and other lights, but the source of electrical power and the light controls are not in the trailer, but instead in the tractor. It is generally not possible to visually inspect these lights, particularly those at the rear of a trailer, from the cab of a coupled tractor, and generally it is not possible to control these lights from any position other than the tractor cab.

One object of the present invention is to provide a relatively simple and inexpensive apparatus for testing at least the air brakes of trailers independent of any tractor air brake system. Another object of the present invention is to provide a lightweight and portable apparatus through which at least the air brakes of a trailer can be applied and released, particularly for the purpose of testing such brakes. A further object of the present invention is to provide such apparatus which can be fully controlled by a single person positioned at the location of the brakes, in full view of the operation of the trailer brake system when the brakes are applied and released through such portable test apparatus. An additional object of the present invention is a such test apparatus which not only controls at least the application and release of the trailer brakes, but also through which the trailer brakes can be held in a charged position while the loss of air pressure in the system over a period of time is measured.

BRIEF SUMMARY OF THE INVENTION

The present invention is a relatively simple and inexpensive apparatus for testing at least the air brakes of trailers, which includes a portable air-brake governing or actuation system and a hand-held control pendent, operating off an independent compressed air supply. Without the coupling of, and connections with, a tractor, the air brakes of a trailer can be applied and released, and held in a charged mode for a period of time during which any loss of air pressure can be monitored. Using the apparatus of the present invention, a single person can conduct the entire air brake test process, including applying and releasing the brakes while simultaneously visually and manually inspecting the brakes. The apparatus in at least some embodiments can be used to test trailer lights using the same portable power source as the brake test device. The invention also includes a testing system which includes the test device interposed between a source of compressed air and the air system of a trailer. The invention also includes a method using the apparatus of the present invention, whereby an air brake test process can be conducted, including applying and releasing the brakes while observing and/or inspecting the brakes.

BRIEF DESCRIPTION OF THE SEVERAL VIEWS OF THE DRAWING

FIG. 6 is a flow diagram of the test method of the present invention.

DETAILED DESCRIPTION OF THE INVENTION

Figure 1:
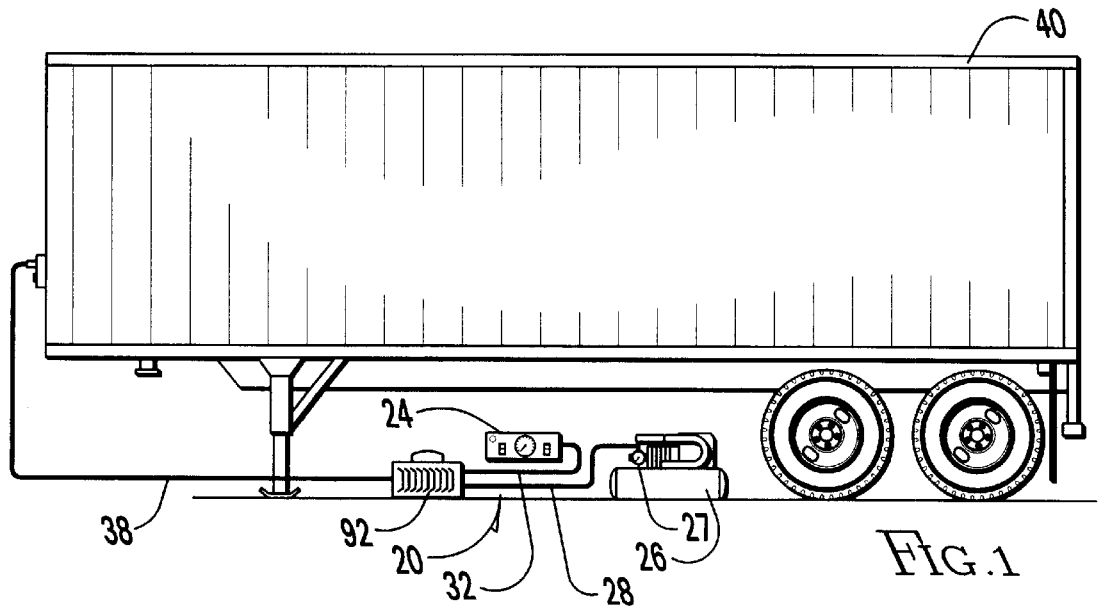
FIG. 1 is a partially diagrammatic view of a test system of the present invention.

Referring to FIGS. 1 to 5, there is shown a portable trailer test device of the present invention designated generally by reference number 20. The test device 20 is comprised of a modular control hub 22 and a separate hand held control pendent 24 having a pressure gauge 25. The test device 20 is shown in its brake testing mode, working off an independent compressed air supply, which as shown is a portable air compressor 26 having a pressure regulator 27. A supply air line 28 runs between the portable air compressor 26 the control hub 22, through which supply air from the portable air compressor 26 is fed into the control hub 22 (details described below). A pendent cable 32, which includes a power cable 34 and a secondary air line 36 within a single casing, runs between the control hub 22 (details described below) and hand held control pendent 24. A trailer air line 38 runs between the control hub 22 and a trailer 40, and is plumbed into the trailer brake service line (not shown) using quick disconnect fittings (not shown).

The control hub 22 further includes a first electric solenoid air valve 42, a second electric solenoid air valve 44, a connecting valve air line 46 and a source of electric power, shown as a 12 V battery 48. The actuations of the first and second solenoid air valves 42, 44 are separately controlled respectively by first and second single pole toggle switches 50, 52 on the control pendent 24. The separately controlled first solenoid 42 and second solenoid 44 combination have three operative modes or configurations, namely both the first and second solenoid 42, 44 open (the "open/open mode"), first solenoid 42 closed with second solenoid 44 open (the "closed/open" mode) and first solenoid 42 closed with second solenoid 44 open to exhaust (the "closed/closed" mode, which can also be referred to as a "closed/exhaust" mode).

The supply air line 28 runs to the first solenoid 42 and is in fluid communication with an internal air chamber 60 therein. When the first solenoid 42 is closed, its internal air chamber 60 is closed both to the supply air line 28 and to the valve air line 46. When the first solenoid 42 is open, its internal air chamber 60 is open both to the supply air line 28 and to the valve air line 46, and provides fluid communication between the supply air line 28 and the valve air line 46. The first toggle switch 50 switches the first solenoid between its two positions, that is between open and closed.

The valve air line 46 runs from the first solenoid 42 to the second solenoid 44 and is in fluid communication with an internal air chamber 62 within the second solenoid 44 when the second solenoid 44 is open. The secondary air line 36 runs to the second solenoid 44, and is in continual fluid communication with its internal air chamber 62. The trailer air line 38 also runs to the second solenoid 44, and is in fluid communication with its internal air chamber 62 both when the second solenoid 44 is open and when the second solenoid 44 is in the exhaust position. The test device 20 also includes an exhaust line 54, which is in fluid communication with the internal air chamber 62 of the second solenoid 44 when the second solenoid 44 is in the exhaust position. The second solenoid 44 therefore provides (via its internal air chamber 62) fluid communication between and among the valve air line 46, the secondary air line 36 and the trailer air line 38 when it is open. When the second solenoid 44 is in the exhaust position, it provides fluid communication between the trailer air line 38 and the exhaust line 54.

In the open/open mode, which can also be referred to as a "charge" mode, the first solenoid 42 and second solenoid 44 in combination provide fluid communication between and among the portable air compressor 26, the air system of the trailer 40 and the control pendent 24, via the supply air line 28, the internal air chamber 60 of the first solenoid 42, the valve air line 46, the internal chamber 62 of the second solenoid 44, the trailer air line 38 and the secondary air line 36. Regulated compressed air is thus supplied to the air system of the trailer 40 and to the control pendent 24. When the mode is switched from the open/open mode to the closed/open mode, which can also be referred to as a "hold-charge" mode, the trailer air system and the control pendent 24 remain in fluid communication via the trailer air line 38, the air chamber of the second solenoid 44, and the secondary air line 36, but not in fluid communication with the portable air compressor 26. In this sequence of first employing the open/open mode to sufficiently charge compressed air to the air system of the trailer 40, whereby the trailer brakes (not shown) are applied, and then switching to the closed/open mode, the trailer brakes are A charged and then held in a charged position (that is, the device 20 is in the hold-charge mode). In addition, the air pressure within the control pendent 24 will be the same as the air pressure in the trailer air system, and any loss of air pressure in the trailer air system over time can be determined by the readings of the pressure gauge 25. The air leakage test therefore can be conducted in this closed/open mode.

The test device 20 is switched first to the open/open mode and then to the closed/open mode simply using the first and second toggle switches 50, 52 on the hand held control pendent 24. The test device 20 thus can be fully controlled by a single person holding the control pendent 24, and that person is free to move about, and be positioned at the location of the brakes, in full view of the operation of the trailer brake system when the brakes are applied using the open/open mode, and while the brakes are held in the applied position using the closed/open mode. This single person can read the pressure gauge 25 and thus perform the air leakage test. This single person is also so without impediments that he can visually and manually inspect the brake rigging and slack adjuster, and make adjustments thereto, merely placing the control pendent 24 down on the ground, or upon any convenient surface, or into any convenient holder, if needed to free both hands.

After brake application, and typically after inspection and air leakage testing, the brakes are released by switching the device 20 from the closed/open mode to the closed/exhaust mode. Switching the second solenoid 44 from the open mode to the exhaust mode closes fluid communication between its air chamber 62 and the air valve line 46 and opens fluid communication between its air chamber 62 and the exhaust air line 54. In either the open or the exhaust mode, the air chamber 62 of the second solenoid 44 remains open to the trailer air line 38. In the exhaust position, the second solenoid 44 releases the compressed charge in the brake air system and thus releases the brakes. The brakes could also be released from an open/open mode;merely by switching the second solenoid 44 to the exhaust position, because that position also closes fluid communication between the trailer air line 38 and the supply air line 28 even when the first solenoid 42 is open. The single person conducting the tests and inspections again simply uses the second toggle switch 52 on the control pendent 24 to switch to the second solenoid 44 from the open position to the exhaust position and thereby release the brakes. He is also able to simultaneous observe the brake release operation.

The normal mode sequence therefore will be first the open/open mode to charge the trailer air system and apply the brakes, then the closed/open mode to hold the brakes in an applied position, and finally the closed/exhaust mode to release the brakes. The open/exhaust mode is typically not used because the first solenoid 42 is closed when the air leak test is conducted, but an open/exhaust mode is not a potential hazard. Again, in either the closed/exhaust mode or open/exhaust mode there is no fluid communication between the first solenoid 42 and the second solenoid 44. On any occasion where the operator wishes to switch from the open/open mode (brake charge or application mode) to a break release mode, he can switch to the closed/exhaust mode using both the first and second toggle switches 50, 52, or instead to the open/exhaust mode using just the second toggle switch 52.

Figure 3:
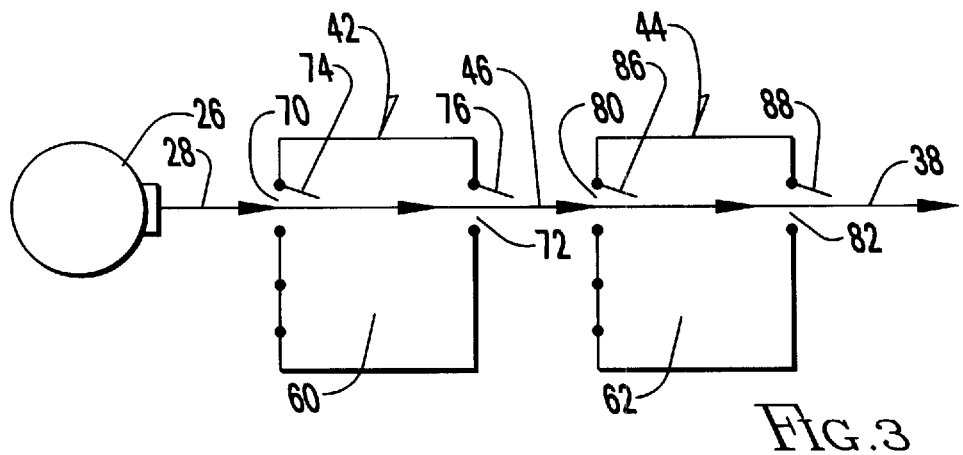
FIG. 3 is a partially diagrammatic view of the part of the test device of FIG. 2 with the air valves in an open/open mode.
Figure 4:
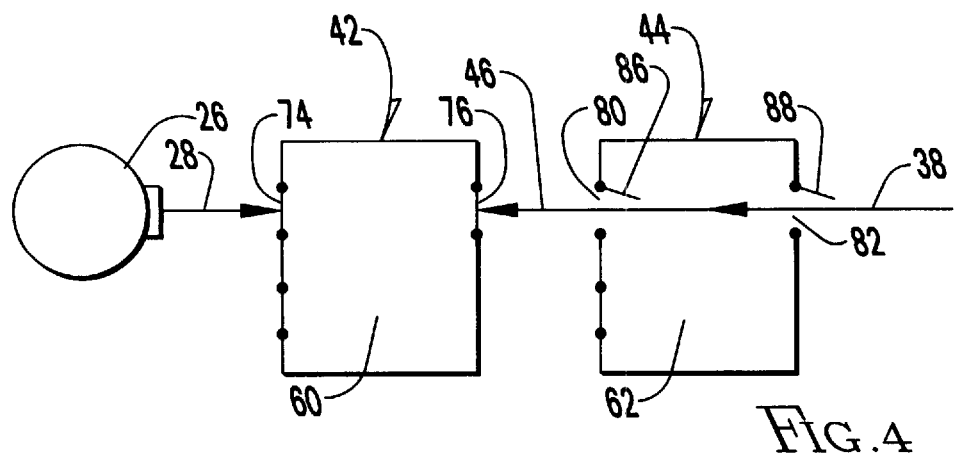
FIG. 4 is a partially diagrammatic view of the part of the test device of FIG. 2 with the air valves in an closed/open mode.
Figure 5:
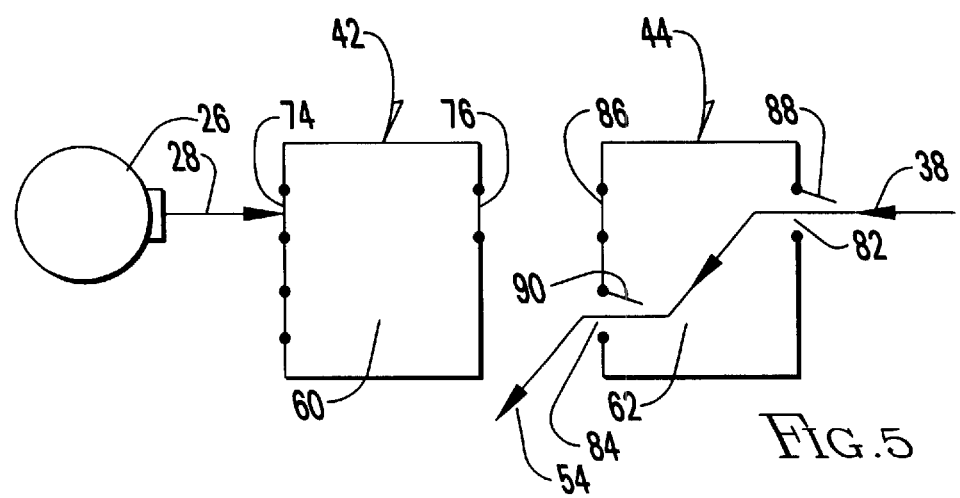
FIG. 5 is a partially diagrammatic view of the part of the test device of FIG. 2 with the air valves in an closed/exhaust mode.

Referring now particularly to FIGS. 3 to 5, the first solenoid 42 has a first and second port 70, 72 and a first and second port closure member 74, 76, which are operated simultaneously. That is, the first and second ports 70, 72 are either both open, or both closed by respectively the first and second port closure member 74, 76. If the solenoid valve employed as the first solenoid 42 is supplied equipped with an exhaust port, that exhaust port would be blocked (in a closed position) in all modes. The second solenoid 44 has a first, second and third port 80, 82, 84 and a first, second and third port closure member 86, 88, 90. The first and third port closure members 86, 90 are operated in the reverse, namely, the first port 80 is open while the third port 84 is closed, and then the first port 80 is closed when the third port 84 is opened. The second port 82 remains open during the operation of the device 20 through the steps of charging the brakes, holding the charge on the brakes, and releasing the brakes.

Figure 2:
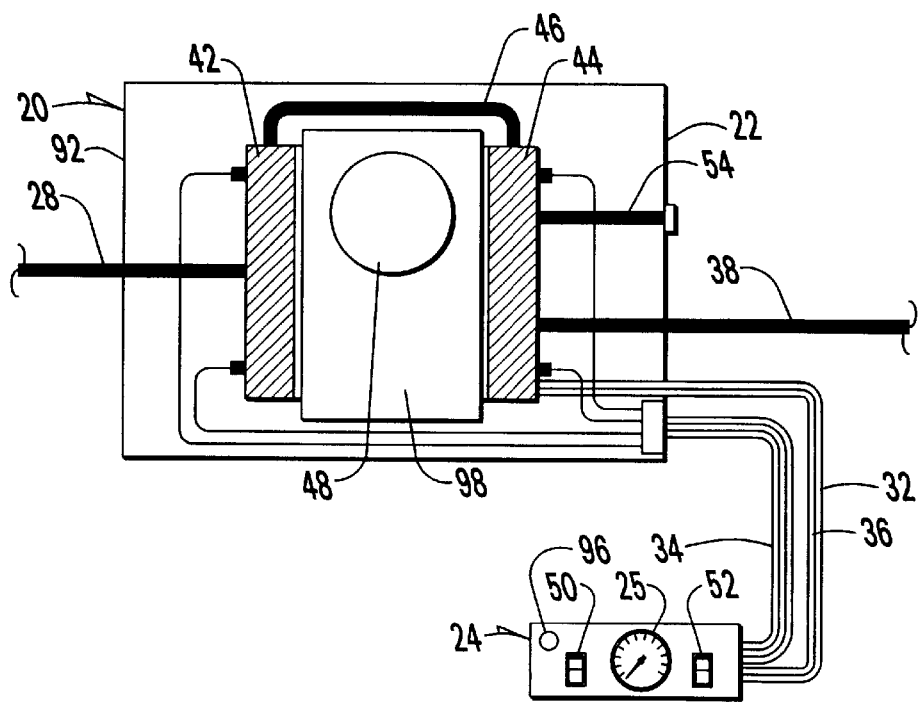
FIG. 2 is a partially diagrammatic view of a test device of the present invention.

As also shown in FIGS. 1 and 2, the entire control hub 22 of the test device 20 is fitted into a weather tight carrying case 92. The packing of the hub 22 into the case 92 facilitates and heightens the portability of the test device 20. The carrying case 92 can be readily outfitted with water tight side wall outlets for the supply air line 28, the power cable 34, and the secondary air line 36, and of course a port for the exhaust line 54.

The electrical leads can readily be removed from solenoid valves 42, 44 and used to test trailer lights. One set of leads would simply be connected to the trailer light system, whereby the lights can be switched on and off using one of the toggle switches on the control pendent 24. The person conducting the test is again free to move about the trailer 40 to observe whether or not the all of the lights are responding. This versatility of the test device 20 is particularly useful when testing lights in remote locations, such as brake lights at the rear end of the trailer 40.

In addition, as best seen in FIG. 2, the test device 20 preferably includes a power indicator lamp 96 mounted on the pendent 24 and the control hub 22 includes a mounting block 98 for securing the components within the carrying case 92.

The test device of the invention can be assembled from commercially available components. For instance, suitable solenoid valves are 12 volt double acting solenoid valves commercially available from John Henry Foster of Minnesota Inc. of Eagan, Minn. When using such double acting solenoid valves, one of the three ports on the first valve would need to be blocked in all modes. Suitable batteries are 12 volt power tool batteries that are readily available from hardware stores, such as Ace Hardware. Components such as the control pendent (conveniently a 2 ¾ inch by 3 inch by 6 ½ inch control pendent), general purpose (momentary contact) toggle switches, power indicator lamp, air hoses, pressure gauge (for instance a two inch, 200 p.s.i. gauge with a center back connection), water-tight carrying case (conveniently an 8 inch by 12 inch by 16 inch carrying case) and miscellaneous fasteners, connectors and fittings, are all commercially available from McMaster Carr Supply, Chicago, Ill.

The present invention therefore in one embodiment is a trailer brake test device comprising a control hub and a control pendent remote from the control hub. The control hub has a power source, a first air valve with a first air chamber and a second air valve with a second air chamber. The control pendent has a pressure gauge, a first on-off switch in electrical communication with the first air valve, and a second on-off switch in electrical communication with the second air valve. The test device further includes a compressed air supply line in fluid communication with the first air chamber, an inter-valve air line in fluid communication with the first air chamber when the first air valve is open and in fluid communication with the second air chamber, a trailer air line in fluid communication with the second air chamber, an exhaust air line in fluid communication with atmosphere through the second air chamber when the second air valve is in an exhaust mode' and a secondary air line providing fluid communication between the control pendent and with the second air chamber.

In preferred embodiments of the test device, the control hub is a modular control hub mounted within a water tight carrying case. The control pendent is preferably a hand held control pendent. The control pendent preferably is a hand held control pendent no wider than about 3 or 3 ½ inches.

In other preferred embodiments of the test device the first and second air valves are solenoid air valves. The source of power preferably is a portable battery. The control pendent preferably further includes a power indicator light.

In preferred embodiments, and as shown, the first air valve has a first and second port, the first and second ports being open when the first air valve is open, and the first and second ports being closed with the first air valve is closed, the supply air line running to the first port and the inter-valve air line running to the second port. Further, the second air valve has a first, second and third port, the first and second ports being open and the third port being closed when the second air valve is open, the second and third ports being open and the first port being closed when the second air valve is in an exhaust mode, the inter-valve air line running to the first port, the trailer air line running to the second port, and the exhaust air line running to the third port.

The invention in another embodiment is a trailer brake test system comprising a source of compressed air, a trailer with an air system and a test device interposed between the source of compressed air and the air system of the trailer. The test device has a control hub. and a control pendent. The control pendent has a pressure gauge. The test device has a charge mode, a hold charge mode and an exhaust mode. The air system of the trailer is in fluid communication the source of compressed air through the test device in the charge mode. The air system of the trailer is in fluid communication with the pressure gauge through the test device in the hold charge mode. The air system of the trailer is in fluid communication with a vent port leading to atmosphere through the test device in the exhaust mode.

In preferred embodiments of the trailer brake test system, the control pendent is remote from the control hub. The control hub has a power source, a first air valve has a first air chamber and a second air valve has a second air chamber. The control pendent has a pressure gauge, a first on-off switch in electrical communication with the first air valve, and a second on-off switch in electrical communication with the second air valve. The system includes a compressed air supply line in fluid communication with the first air chamber, an inter-valve air line in fluid communication with the first air chamber when the first air valve is open and in fluid communication with the second air chamber, a trailer air line in fluid communication with the second air chamber, an exhaust air line in fluid communication with the second air chamber when the second air valve is in an exhaust mode and in fluid communication with atmosphere' and a secondary air line in fluid communication with the control pendent and with the second air chamber.

In another embodiment the present invention is a method of testing trailer brakes as shown in FIG. 6 comprising the steps of:

(a) connecting a test device between an air line of a trailer and a source of compressed air, the test device has a control hub and a control pendent, and the control pendent has controls and a pressure gauge;

(b) then charging the air line of the trailer with compressed air from the source of compressed air through the test device by the operation of the controls of the control pendent;

(c) then holding the charge in the air line of the trailer by the operation of the controls of the control pendent while determining air leakage from the air line; and (d) then exhausting the charge in the air line of the trailer through the test device by the operation of the controls of the control pendent.

In preferred embodiments in step (b) the charging of the air line of the trailer with compressed air from the source of compressed air through the test device by the operation of the controls of the control pendent is executed by a single operator manually holding the control pendent. In preferred embodiments in step (c) the holding of the charge in the air line of the trailer by the operation of the controls of the control pendent while determining air leakage from the air line is executed by a single operator manually holding the control pendent. In preferred embodiments in step (d) the exhausting of the charge in the air line of the trailer through the test device by the operation of the controls of the control pendent is executed by a single operator manually holding the control pendent. In preferred embodiments in steps (b), (c) and (d), the charging of the air line, the holding of the charge in the air line and the exhausting of the charge in the air line of the trailer are executed by a single operator manually holding the control pendent.

In preferred embodiments in step (b) the air line of the trailer is charged with compressed air from the source of compressed air through the test device by the operation of a first switch and a second switch on the control pendent, whereby a first air valve and a second air valve in the control hub are opened responsive to the operation of the first switch and the second switch on the control pendent. The opening of the first and second air valves provides fluid communication between the source of compressed air and the air line of the trailer through the first and second valves.

In preferred embodiments in step (c) the charge in the air line of the trailer is held by the operation of the a first switch of the control pendent, closing the first valve while the second valve remains open. The closing of the first valve while the second valve remains open terminating fluid communication between the source of compressed air and the air line of the trailer while retaining fluid communication between the second valve and the air line of the trailer.

In preferred embodiments in step (d) the charge in the air line of the trailer is exhausted by the operation of the second switch on the control pendent, whereby fluid communication between the air line of the trailer and atmosphere is opened through the second air valve.

In preferred embodiments, the method further includes the step of visual and/or manual inspection of at least one brake on the trailer executed by the single operator concomitantly with the execution of step (b), step (c), and/or step (d).

The above described embodiments are exemplitive, and the terminology is employed for illustration purposes and not limitation purposes. The present invention is not limited to the combinations and subcombinations illustrated herein.

I claim:

1. A trailer brake test device comprising:

a control hub;

a control pendent remote from said control hub;

said control hub having a power source, a first air valve having a first air chamber and a second air valve having a second air chamber;

said control pendent having a pressure gauge, a first on-off switch in electrical communication with said first air valve, and a second on-off switch in electrical communication with said second air valve;

a compressed air supply line in fluid communication with said first air chamber;

an inter-valve air line in fluid communication with said first air chamber when said first air valve is open and in fluid communication with said second air chamber;

a trailer air line in fluid communication with said second air chamber;

an exhaust air line in fluid communication with atmosphere through said second air chamber when said second air valve is in an exhaust mode; and a secondary air line providing fluid communication between said control pendent and said second air chamber.

2. The test device of claim 1 wherein said control hub is a modular control hub mounted within a water tight carrying case.

3. The test device of claim 1 wherein said control pendent is a hand held control pendent.

4. The test device of claim 1 wherein said control pendent is a hand held control pendent no wider than about 3½ inches.

5. The test device of claim 1 wherein said first and second air valves are solenoid air valves.

6. The test device of claim 1 wherein said source of power is a portable battery.

7. The test device of claim 1 wherein said control pendent further includes a power indicator light.

8. The test device of claim 1, said first air valve having a first and second port, said first and second ports being open when said first air valve is open, and said first and second ports being closed with said first air valve is closed, said supply air line running to said first port and said inter-valve air line running to said second port; and said second air valve having a first, second and third port, said first and second ports being open and said third port being closed when said second air valve is open, said second and third ports being open and said first port being closed when said second air valve is in an exhaust mode, said inter-valve air line running to said first port, said trailer air line running to said second port, and said exhaust air line running to said third port.

9. A trailer brake test system comprising:

a source of compressed air;

a trailer having an air system;

a test device interposed between said source of compressed air and said air system of said trailer;

said test device having a control hub and a control pendent, said control hub having a power source, a first air valve having a first air chamber and a second air valve having a second air chamber, said control pendent being remote from said control hub and having a pressure gauge, a first on-off switch in electrical communication with said first air valve, and a second on-off switch in electrical communication with said second air valve;

a compressed air supply line in fluid communication with said first air chamber;

an inter-valve air line in fluid communication with said first air chamber when said first air valve is open and in fluid communication with said second air chamber;

a trailer air line in fluid communication with said second air chamber;

an exhaust air line in fluid communication with said second air chamber when said second air valve is in an exhaust mode and in fluid communication with atmosphere; and a secondary air line in fluid communication with said control pendent and with said second air chamber, said test device having a charge mode, a hold charge mode and an exhaust mode, said air system of said trailer being in fluid communication said source of compressed air through said test device in said charge mode, said air system of said trailer being in fluid communication with said pressure gauge through said test device in said hold charge mode, and said air system of said trailer being in fluid communication with a vent port leading to atmosphere through said test device in said exhaust mode.

10. The test system of claim 9 wherein said control hub is a modular control hub mounted within a water tight carrying case.

11. The test system of claim 9 wherein said control pendent is a hand held control pendent.

12. The test system of claim 9 wherein said control pendent is a hand held control pendent no wider than about 3½ inches.

13. The test system of claim 9 wherein said first and second air valves are solenoid air valves.

14. The test system of claim 9, said first air valve having a first and second port, said first and second ports being open when said first air valve is open, and said first and second ports being closed with said first air valve is closed, said supply air line running to said first port and said inter-valve air line running to said second port; and said second air valve having a first, second and third port, said first and second ports being open and said third port being closed when said second air valve is open, said second and third ports being open and said first port being closed when said second air valve is in an exhaust mode, said inter-valve air line running to said first port, said trailer air line running to said second port, and said exhaust air line running to said third port.

15. A method of testing trailer brakes comprising the steps of:

(a) connecting a test device between an air line of a trailer and a source of compressed air, said test device having a control hub and a control pendent, and said control pendent having a set of controls and a pressure gauge;

(b) then charging said air line of said trailer with compressed air from said source of compressed air through said test device by the operation of said controls of said control pendent;

(c) then holding the charge in said air line of said trailer by the operation of said controls of said control pendent while determining air leakage from said air line; and (d) then exhausting the charge in said air line of said trailer through said test device by the operation of said controls of said control pendent, wherein in step (b) said air line of said trailer is charged with compressed air from said source of compressed air through said test device by the operation of a first switch and a second switch on said control pendent, whereby a first air valve and a second air valve in said control hub are opened responsive to said operation of said first switch and said second switch on said control pendent, said opening of said first and second air valves providing fluid communication between said source of compressed air and said air line of said trailer through said first and second valves, and wherein in step (c) said charge in said air line of said trailer is held by the operation of said a first switch of said control pendent, closing said first valve while said second valve remains open, said closing of said first valve while said second valve remains open terminating fluid communication between said source of compressed air and said air line of said trailer while retaining fluid communication between said second valve and said air line of said trailer.

16. The method of testing trailer brakes of claim 15 wherein in step (b)

said charging of said air line of said trailer with compressed air from said source of compressed air through said test device by the operation of said controls of said control pendent is executed by a single operator manually holding said control pendent.

17. The method of testing trailer brakes of claim 15 wherein in step (c)

said holding of said charge in said air line of said trailer by the operation of said controls of said control pendent while determining air leakage from said air line is executed by a single operator manually holding said control pendent.

18. The method of testing trailer brakes of claim 15 wherein in step (d)

said exhausting of said charge in said air line of said trailer through said test device by the operation of said controls of said control pendent is executed by a single operator manually holding said control pendent.

19. The method of testing trailer brakes of claim 15 wherein in steps (b), (c) and (d)

said charging of said air line of said trailer with compressed air from said source of compressed air through said test device by the operation of said controls of said control pendent, said holding of said charge in said air line of said trailer by the operation of said controls of said control pendent while determining air leakage from said air line, and said exhausting of said charge in said air line of said trailer through said test device by the operation of said controls of said control pendent are executed by a single operator manually holding said control pendent.

20. The method of testing trailer brakes of claim 15 wherein in step (d)

said charge in said air line of said trailer is exhausted by the operation of said second switch on said control pendent whereby fluid communication between said air line of said trailer and atmosphere is opened through said second air valve.

21. The method of testing trailer brakes of claim 20 wherein in steps (b), (c) and (d)

said charging of said air line of said trailer with compressed air from said source of compressed air through said test device by the operation of said controls of said control pendent, said holding of said charge in said air line of said trailer by the operation of said controls of said control pendent while determining air leakage from said air line, and said exhausting of said charge in said air line of said trailer through said test device by the operation of said controls of said control pendent are executed by a single operator manually holding said control pendent.

22. The method of testing trailer brakes of claim 21 further including the step of visual and/or manual inspection of at least one brake on said trailer executed by said single operator concomitantly with the execution of step (b), step (c), and/or step (d).

* * * * *